United States Patent
Lopez et al.

(10) Patent No.: US 10,602,764 B2
(45) Date of Patent: Mar. 31, 2020

(54) ROASTING SYSTEM WITH CLEAN EMISSIONS AND HIGH THERMAL EFFICIENCY

(71) Applicant: Bellwether Coffee Co., Berkeley, CA (US)

(72) Inventors: Ricardo Lopez, Bolinas, CA (US); John Sandhu, Boulder, CO (US); Arno Holschuh, Berkeley, CA (US)

(73) Assignee: Bellwether Coffee Co., Berkeley, CA (US)

(*) Notice: Subject to any disclaimer, the term of this patent is extended or adjusted under 35 U.S.C. 154(b) by 0 days.

(21) Appl. No.: 16/525,328

(22) Filed: Jul. 29, 2019

(65) Prior Publication Data

US 2019/0350247 A1 Nov. 21, 2019

Related U.S. Application Data

(63) Continuation-in-part of application No. 15/949,903, filed on Apr. 10, 2018, now Pat. No. 10,362,798.
(Continued)

(51) Int. Cl.
*A23N 12/10* (2006.01)
*A23F 5/04* (2006.01)
(Continued)

(52) U.S. Cl.
CPC .............. *A23N 12/08* (2013.01); *A23F 5/04* (2013.01)

(58) Field of Classification Search
CPC ........ A23N 12/08; A23N 12/10; A23N 12/12; A23N 12/125; A23F 5/04; A23F 5/046; A23F 5/16; A23V 2300/24
See application file for complete search history.

(56) References Cited

U.S. PATENT DOCUMENTS

| 2,081,349 A | 5/1937 | Backer et al. |
| 2,762,289 A | 9/1956 | Crutcher, Jr. |

(Continued)

FOREIGN PATENT DOCUMENTS

| JP | S63-296676 A | 12/1988 |
| JP | 010-63366 | 3/1989 |

(Continued)

OTHER PUBLICATIONS

Office Action for U.S. Appl. No. 15/949,903, dated Nov. 27, 2018, 7 pages.
(Continued)

*Primary Examiner* — Anthony J Weier
(74) *Attorney, Agent, or Firm* — Cooley LLP

(57) ABSTRACT

A bean roasting system includes a roasting chamber, a blower, a variable diverter and a controller. The roasting chamber, the blower and the variable diverter each is disposed at least partially within a recirculating gas flow path. The blower is configured to provide a flow stream of gas through the recirculating gas flow path. The variable diverter is configured to split the gas flow path into at least two flow paths including a treated flow path and a bypass flow path. The treated flow path includes a series arrangement of a gas heater and a catalytic converter. The variable diverter is configured to control a percentage of a flow stream of gas that is diverted into the bypass flow path. The controller is configured to activate different predetermined operating modes for the bean roasting system by controlling a state of the variable diverter and a state of the heater.

19 Claims, 8 Drawing Sheets

Related U.S. Application Data

(60) Provisional application No. 62/485,206, filed on Apr. 13, 2017.

(51) Int. Cl.
*A23F 5/16* (2006.01)
*A23N 12/08* (2006.01)

(56) References Cited

U.S. PATENT DOCUMENTS

| | | | |
|---|---|---|---|
| 3,328,172 A | 6/1967 | Smith, Jr. | |
| 3,329,506 A | 7/1967 | Smith, Jr. | |
| 4,860,461 A | 8/1989 | Tamaki et al. | |
| 4,924,765 A | 5/1990 | Pera | |
| 5,355,783 A | 10/1994 | Cochran | |
| 5,718,164 A | 2/1998 | Finken et al. | |
| 5,749,288 A | 5/1998 | Skaling | |
| 5,928,697 A * | 7/1999 | Argiles Felip | A23N 12/08 426/466 |
| 5,958,494 A | 9/1999 | Tidland et al. | |
| 6,053,093 A | 4/2000 | Gerhardt et al. | |
| 6,260,479 B1 * | 7/2001 | Friedrich | A23F 5/04 34/233 |
| 6,382,087 B1 | 5/2002 | Iiyama | |
| 6,558,726 B2 | 5/2003 | Erickson et al. | |
| 7,143,686 B1 | 12/2006 | Sandolo | |
| 7,285,300 B1 | 10/2007 | Allington et al. | |
| 7,875,833 B2 | 1/2011 | Song | |
| 7,998,515 B2 | 8/2011 | Weisberg et al. | |
| 9,089,160 B2 | 7/2015 | Abbing et al. | |
| 10,362,798 B2 * | 7/2019 | Lopez | A23N 12/10 |
| 2009/0130277 A1 | 5/2009 | Bressner et al. | |
| 2010/0051602 A1 | 3/2010 | Beardsley et al. | |
| 2010/0083525 A1 | 4/2010 | Lange et al. | |
| 2016/0016181 A1 | 1/2016 | Lathrop et al. | |
| 2018/0295870 A1 | 10/2018 | Lopez et al. | |
| 2018/0304197 A1 * | 10/2018 | Furfori | A23F 5/04 |

FOREIGN PATENT DOCUMENTS

| | | |
|---|---|---|
| WO | WO 1998/028992 | 7/1998 |
| WO | WO 1999/023888 | 5/1999 |
| WO | WO 2011/136632 | 11/2011 |

OTHER PUBLICATIONS

International Search Report and Written Opinion for International Application No. PCT/US2018/026946, dated Jun. 21, 2018, 14 pages.

* cited by examiner

US 10,602,764 B2

ROASTING SYSTEM WITH CLEAN EMISSIONS AND HIGH THERMAL EFFICIENCY

CROSS REFERENCE TO RELATED APPLICATIONS

This non-provisional patent application is a continuation-in-part of U.S. application Ser. No. 15/949,903, filed on Apr. 10, 2018, now U.S. Pat. No. 10,362,798, which claims priority to U.S. Provisional Application No. 62/485,206, filed Apr. 13, 2017, each entitled "ROASTING SYSTEM WITH CLEAN EMISSIONS AND HIGH THERMAL EFFICIENCY" by Ricardo Lopez et al., each of which is incorporated herein by reference under the benefit of 35 U.S.C. 119(e).

FIELD OF THE DISCLOSURE

The present disclosure pertains to the roasting of food products, particularly to beans, and more particularly to coffee beans. Yet more particularly the present disclosure describes a roasting system that has improved gas or air handling to improve both emissions and energy efficiency of the roaster in a compact size.

BACKGROUND

Food roasting machines are in wide use. One particularly common roasting machine is utilized to prepare coffee beans to be either packaged or ground and brewed. The roasting process consumes considerable energy and, without some emissions treatment, emits noxious gases. To reduce the emissions, various solutions have been employed such as those that utilize high temperature incineration of the output stream along with costly filtration. The incineration adds to the energy consumption and complexity of the roasting system. In addition, the practice of incineration also often involves installation of costly ventilation systems, which some buildings are unable to accommodate. There is an ongoing need to find better designs that reduce energy consumption and provide a clean output.

SUMMARY

Figure 1:
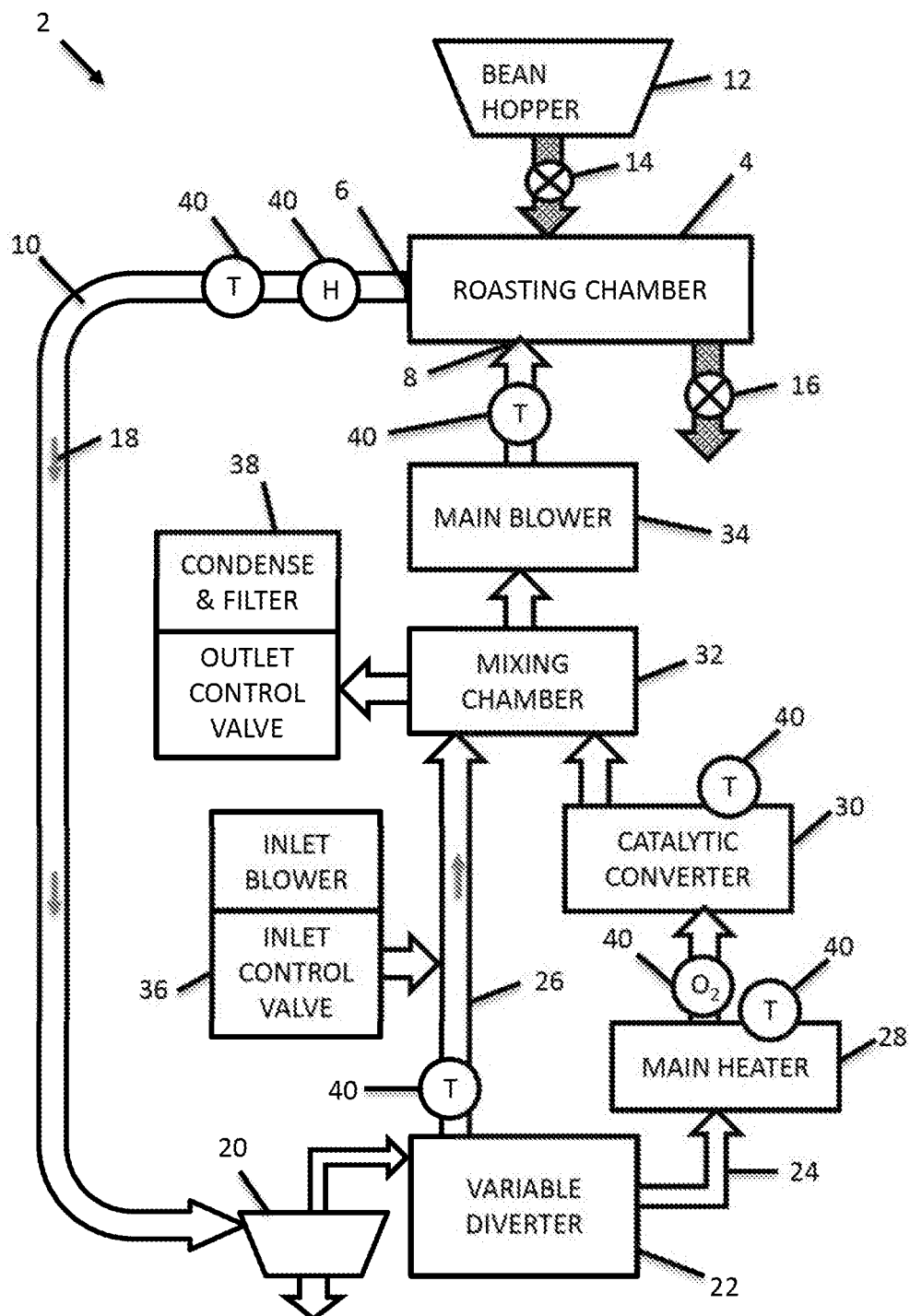
FIG. 1 is a block diagram schematic of a first embodiment of a roasting system.

In an aspect of the disclosure, a bean roasting system includes a roasting chamber, a plurality of components, a drum bypass valve, and a controller. The roasting chamber has a gas inlet and a gas outlet coupled to a recirculating gas flow path. During operation, gas flows out of the gas outlet, through the recirculating gas flow path, and back to the gas inlet. The plurality of components are fluidically coupled to and at least partially define the recirculating gas flow path. The plurality of components includes a cyclonic separator, one or more heaters, a catalytic converter, and a main blower. The drum bypass valve couples the main blower to the cyclonic separator while bypassing the roasting chamber. The controller is configured to at least control a state of the one or more heaters and the drum bypass valve to define a plurality of operating states. The operating states are defined by temperatures of at least the roasting chamber.

In one implementation, the one or more heaters includes a main heater and an auxiliary heater. The main heater can be fluidically coupled between the cyclonic separator and the catalytic converter. The auxiliary heater can be fluidically coupled between the main blower and the roasting chamber gas inlet. The controller can be configured to separately control a state of the main heater and a state of the auxiliary heater to define the plurality of operating states.

In another implementation, the main blower is coupled between the catalytic converter and the roasting chamber. The controller can be configured to control a state of the main blower to define the plurality of operating states.

In yet another implementation the system includes an inlet valve and blower unit coupled between an ambient air inlet port and the roasting chamber. The inlet valve and blower unit provides added ambient air to the main blower to replace air that is released from the system.

In a further implementation one of the operating modes is a startup operating mode in which the drum bypass valve is closed or diverts less than 10 percent of a gas flow from the main blower to the cyclonic separator. This allows most or all of heat from the main heater to quickly raise a temperature of the roasting chamber.

In a yet further implementation one of the operating modes has the drum bypass valve diverting 50 to 90% of air from the main blower to the cyclonic separator. This allows the main heater to more rapidly raise a temperature of the catalytic converter.

In a second aspect of the disclosure, a bean roasting system includes a roasting chamber, a plurality of components, a drum bypass valve, and a controller. The roasting chamber has a gas inlet and a gas outlet coupled to a recirculating gas flow path. Gas flows out of the gas outlet, through the recirculating gas flow path, and back to the gas inlet. The plurality of components are fluidically coupled to and at least partially define the recirculating gas flow path. The plurality of components includes a cyclonic separator, a main heater, a catalytic converter, a main blower, and an auxiliary heater. Along the recirculating gas flow path, gas flows out of the roasting chamber through the gas outlet, through the cyclonic separator, through the main heater, through the catalytic converter, through the main blower, through the auxiliary heater, and back into the roasting chamber through the gas inlet. The drum bypass valve couples the main blower to the cyclonic separator. The drum bypass valve diverts a percentage of the air flow from the main blower to the cyclonic separator while bypassing the roasting chamber. The percentage can vary from zero to 90 percent. The controller individually controls some or all of the plurality of components to effect or produce operating states. Operating states are defined in part by various parameters including two or more of a roasting chamber temperature, a catalytic converter temperature, and a flow rate of gas through the roasting chamber.

DETAILED DESCRIPTION

FIG. 1 is a block diagram schematic of a first embodiment of a roasting system 2, according to an embodiment. Roasting system 2 includes a roasting chamber 4 having a gas outlet 6 and a gas inlet 8. A gas conduit 10, in combination with other relevant components discussed below, defines a recirculating gas flow path (referenced herein interchangeably as gas conduit 10 or recirculating gas flow path 10) and is coupled to and includes the roasting chamber 4. The recirculating gas flow path 10 performs a number of functions including removing debris and noxious gases from the roasting process and regulating a temperature of the roasting chamber 4. The roasting system 2 also includes a bean hopper 12 for a loading unroasted beans before they are inputted to the roasting chamber 4. Between the bean hopper 12 and the roasting chamber 4 is a load valve 14 for releasing the beans from the hopper 12 into the roasting chamber 4. An unload valve 16 is for releasing the beans to a bean cooling system (not shown).

During operation of the roasting system 2 a flow stream 18 of gas is established in the recirculating gas flow path 10 from the gas outlet 6 to the gas inlet 8 of the roasting chamber 4. After leaving the gas outlet 6 the flow stream 18 passes to a cyclonic separator 20, which removes debris from the gas flow stream 18 that is collected below the cyclonic separator 20.

The flow stream 18 then passes to a variable diverter 22. Variable diverter 22 splits the gas flow path 10 into at least two flow path segments including a treated flow path segment 24 and a bypass flow segment 26. The variable diverter 22 controls a "bypass percentage," which is a percentage of the flow stream 18 that is diverted into the bypass flow segment 26. The bypass percentage can be varied between zero percent to 100 percent of the mass flow of the flow stream 18. When the bypass percentage is zero then all of the mass flow of the flow stream 18 is flowing through the treated flow path segment 24. When the bypass percentage is X, then 100−X percent of the mass flow of the flow stream is passing through the treated flow segment 24 and X percent of the mass flow of the flow stream 18 is passing through the bypass flow segment 26. When the bypass percentage is 100, then all of the mass flow of the flow stream 18 is passing through the bypass flow segment 26.

The treated flow segment 24 includes a heater 28 and a catalytic converter 30 in a fluidic series. In the embodiment shown in FIG. 1, the heater 28 is the main heater 28 for the catalytic converter 30 and the roasting chamber 4. The catalytic converter 30 has an operating temperature (referred to as a catalyst temperature $T_{CT}$) that is used for catalysis. A catalyst temperature $T_{CT}$ is typically in a range of 500 to 1000 degrees Fahrenheit. On the other hand, the roasting chamber 4 has a roasting chamber temperature $T_{RC}$ that can vary between 150 and 500 degrees Fahrenheit depending upon a desired roasting process and a step within the process.

The bypass flow segment 26 is coupled to a mixing chamber 32 (also referred to herein as a junction 32). The mixing chamber 32 (junction 32) defines the point at which the separated or split flow paths recombine into one flow path. Between the junction 32 and the gas inlet 8 of the roasting chamber 4 is a main blower 34.

Coupled to the bypass flow segment 26 is an inlet component 36 to allow ambient air to enter the recirculating gas flow path 10. The inlet component 36 includes an inlet control valve and inlet blower coupled in series to allow and force ambient air into the recirculating gas flow path 10. Coupled to the mixing chamber 32 is a outlet component 38 to release gas from the recirculating gas flow path 10 to the ambient environment. The outlet component 38 includes an outlet control valve, a condenser, and a filter in series.

The roasting system 2 employs various sensors 40 including temperature sensors T. These sensors 40 are utilized to enable a closed loop control of various processes within the roasting system 2.

In alternative embodiments the bypass flow segment can include an auxiliary heating and/or cooling temperature modulator 44. In another alternative embodiment the main blower 34 can be located at other locations in the recirculating gas flow path 10 or multiple blowers can be employed. In yet another alternative embodiment, the inlet component 36 may be integrated into the mixing chamber, and the outlet component 38 may be moved to a point in the fluid flow path that is immediately after the catalytic converter.

Figure 2:
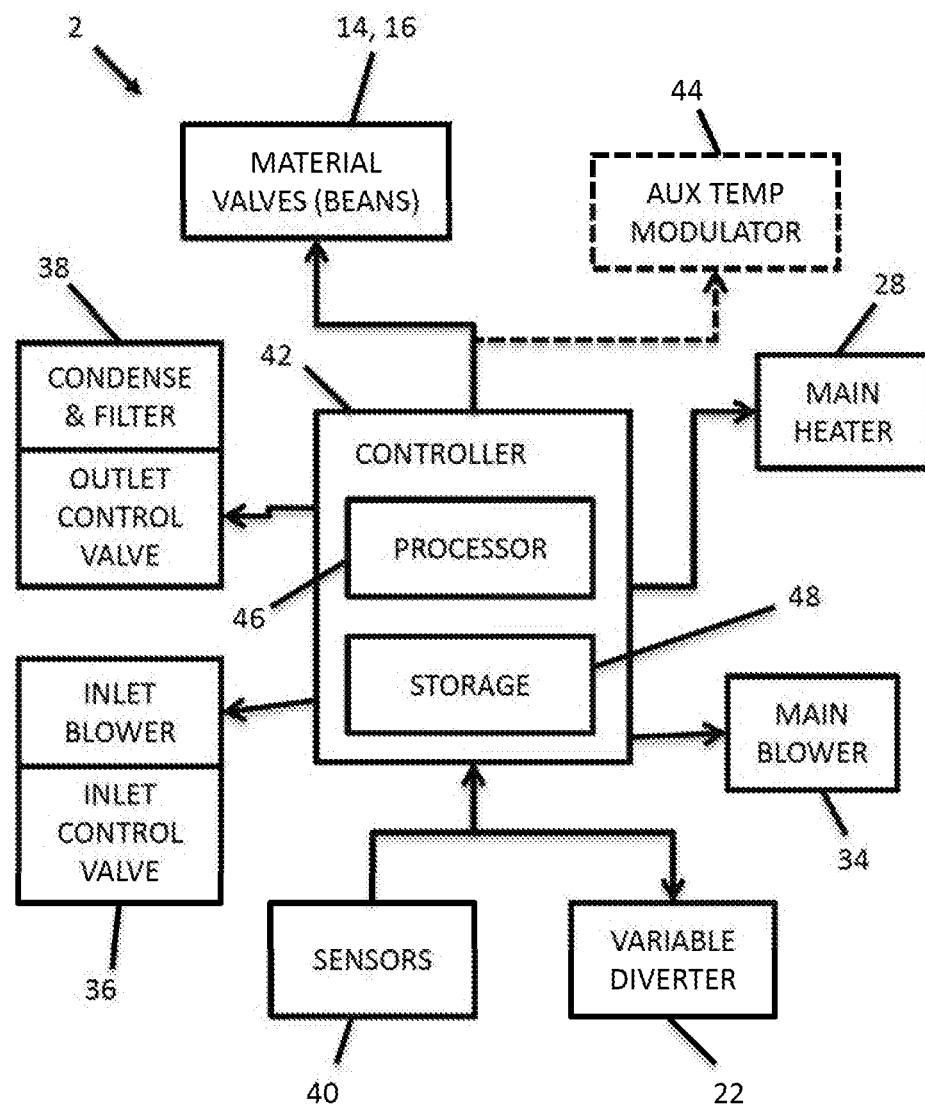
FIG. 2 is an electrical block diagram of an example roasting system.

FIG. 2 is an electrical block diagram of the roasting system 2 of FIG. 1. Some reference numbers in FIG. 2 correspond to reference numbers in FIG. 1. Roasting system 2 includes a controller 42 that receives signals from sensors 40 and provides control signals to various components including valves 14 and 16, variable diverter 22, main heater 28, main blower 34, inlet component 36, outlet component 38, and optionally an auxiliary temperature modulator 44 (providing heating and/or cooling).

Controller 40 includes a processor 46 coupled to an information storage device 48. The information storage device 48 includes a non-transient or non-volatile storage device storing software that, when executed by processor 46, controls the various components of roasting system 2 and provides functions for which the controller 42 is configured. The controller 42 can be a located at one location or distributed among multiple locations in roasting system 2. For example, controller 42 can be disposed within a housing (not shown) of roasting system 2 and/or a housing of an appropriate component of roasting system 22 such as a housing of the variable diverter 22. The controller can be electrically and/or wirelessly linked to the various components of roasting system 2.

The controller 42 is configured to define and activate a plurality of different predetermined or predefined operating modes. Each operating mode can define a step or process in a sequence of steps and processes that are executed during the operation of the roasting system 2. An example sequence will be described with respect to FIG. 3.

A particular operating mode can be defined, for example, in part by a time duration and a state of various components of the roasting system 2. States that are directly controlled are those of components that receive direct control signals from the controller 42. Examples of directly controlled states include the bypass percentage of the variable diverter 22, an output power of the main heater 28, an airflow rate of the main blower 34, and a control of the inlet and outlet components 36 and 38 respectively. An optional example would be control of auxiliary temperature modulator 44.

States that are indirectly determined are those states that are a consequence of those states that are directly determined. These include a temperature of the roasting chamber 4 and an internal temperature of the catalytic converter 30. These temperatures are determined (and thereby indirectly controlled) through the control of the main heater 28, the main blower 34, and the variable diverter 22.

Controller 42 reads signals or data from sensors 40 indicative of various temperatures within the roasting system 2. These signals or data may be indicative of a temperature of the roasting chamber 4, the catalytic converter 30, or various portions of the recirculating flow path 10. The controller 42 then modulates the directly controlled states to maintain desired temperature set points.

Figure 3:
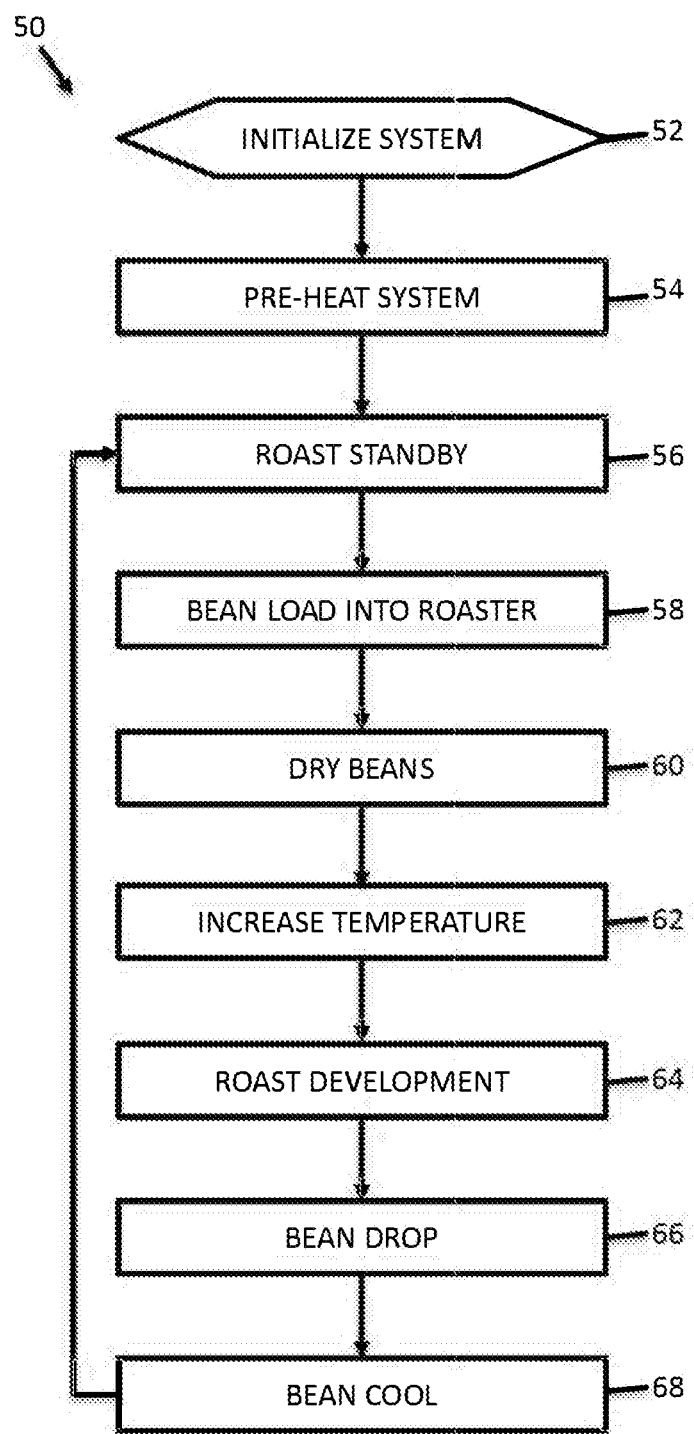
FIG. 3 is a flowchart representing an example sequence of operation for a roasting system.

FIG. 3 is a flowchart representing an example sequence of operation 50 for the roasting system 2. Each step of the operational sequence is based upon a predetermined operating mode an indicator for which is stored in controller 42. For each of these steps the controller 42 controls various components as discussed with respect to FIG. 2.

Step 52 represents an initial state of the roasting system 2 after it has been off long enough to equilibrate with an ambient environment. The heater power is zero, meaning that no power is being sent to main heater 28. The main blower 34 is off. As a result the catalytic converter 30 temperature and the roasting chamber 4 temperatures are both at ambient temperature which can be about 70 degrees Fahrenheit.

Step 54 represents a pre-heat mode for the roasting system 2. This operational mode can have a time duration of about 30 minutes. During this mode the power delivered to the main heater 28 is in a "high" state. In one implementation the power delivered to main heater 28 is more than 75 percent or even 100 percent of the maximum power level that is used for the main heater 28. The main blower 34 is operated in a "high" state. In one particular implementation the main blower 34 is operated with a flow rate of 200 cubic feet per minute, and the bypass percentage starts out at a low value or less than 10 percent or even zero and then ramps up to bypass percentage of more than 50 percent, more than 75 percent or about 85 to 90 percent. In another implementation, the bypass percentage is kept at a low value throughout preheat, and the blower speed is decreased as the system heats up in order to reduce the delivery energy to various parts of the system. In this case, the heater temperature remains high, but the energy drawn and outputted by the heater is lower due to the decrease in energy transport. During the pre-heat mode the temperature of the catalytic converter 30 ramps up from ambient temperature to an effective catalytic temperature in a range of 500 to 1000 degrees Fahrenheit. In one implementation the catalytic temperature is about 800 degrees Fahrenheit. The roast chamber 4 temperature also ramps up to a temperature range to begin the roasting process. In one embodiment this temperature is in a range of 300 to 400 degrees Fahrenheit or about 350 degrees Fahrenheit.

Step 56 represents a standby mode that has an indeterminate duration. During this operational mode the power delivered to the main heater 28 is in a "low" state. In one implementation the power delivered to heater 28 is less than 50 percent in a range of about 5 to 15 percent of the maximum power level that is used for the main heater. This low main heater 28 power is all that is used to maintain the catalytic converter 30 temperature and the roasting chamber 4 temperature. In one implementation, the main blower is operated in a "low" state. In one implementation the main blower is operated with a flow rate of 100 cubic feet per minute (CFM). In this case, the bypass percentage is more than 50 percent, more than 75 percent, or in a range of about 85 to 90 percent. In another implementation, the main blower operates at an output less than 100 cubic feet per minute (CFM), and the speed is modulated to control the energy distribution throughout the system. In this case, the bypass percentage is kept low, around 0-10 percent. In all cases, catalytic converter 30 temperature is in a range of 500 to 1000 degrees Fahrenheit or about 800 degrees Fahrenheit. The roasting chamber 4 temperature is in a range of 300 to 400 degrees Fahrenheit or about 350 degrees Fahrenheit.

Step 58 represents an operational mode in which the valve 14 is opened to load beans from the hopper 12 to the roasting chamber 4. The component states for step 58 are the same as those of step 57 except that the main blower is operated in a "high" state. In one implementation the main blower 34 is operated with a flow rate of 200 cubic feet per minute.

Steps 60, 62, and 64 represent a complete cycle for bean roasting. During these steps the main blower 34 is operated in a "high" state which can be 200 cubic feet per minute. The combined time duration for steps 60, 62, and 64 is about 10-15 minutes.

Step 60 is an operational mode for drying the beans, which can last about 1-3 minutes. The main heater 28 is operated with a "low" power level, which can be in a range of 10 to 20 percent of maximum power. The bypass percentage is in a range of 50 to 90 percent or about 71 percent. The catalyst temperature in a range of 500 to 1000 degrees Fahrenheit or about 800 degrees Fahrenheit. The roast chamber 4 temperature is in a range of about 170 to 180 degrees Fahrenheit or about 175 degrees Fahrenheit.

Step 62 is a "recovery ramp" mode during which the roasting chamber temperature is increased to a roasting development temperature. The "recovery ramp" mode can have a duration of about 3-6 minutes. The main heater 28 is operated with a "high" power level which can be in a range of 75 to 100 percent of maximum power. The bypass percentage is in a range of zero to 10 percent so that some gas having a higher temperature from the main heater 28 is directed to the roasting chamber 4. As a result, the roasting chamber temperature increases to a roasting development temperature, which can be about 390 degrees Fahrenheit. During step 62 the catalyst temperature may fall to about 650 degrees Fahrenheit.

Step 64 is a roasting development mode during which the temperature of the roasting chamber 4 is increased. The roasting development mode has a duration of about 3 minutes. The main heater 28 is operated with a "low" power that can be 20 to 30 percent of maximum power. The bypass percentage is in a range of 50 to 100 percent or about 76 percent. The bypass percentage can be increased while the heater input is decreased during this mode. The roasting chamber 4 temperature increases from about 390 degrees Fahrenheit to about 460 degrees Fahrenheit. The catalyst temperature increases from about 650 degrees Fahrenheit to about 750 degrees Fahrenheit. Also as part of this mode, the inlet 36 and outlet 38 components are operated to allow a one to five percent gas exchange with the ambient air environment.

During step 66 the valve 16 is opened to drop the roasted beans into a cooling chamber. During step 68 the beans are cooled and the system states are returned to those of the standby mode of step 56 after a preheating operation.

As a note, the specific states described above with respect to FIG. 3 can vary depending on a desired "roasting profile." In particular, the roasting chamber 4 temperature states are a function of such a roasting profile. Thus, the described sequence 50 can have variations in terms of component states and the temperatures indicated with respect to FIG. 3 are examples for a particular roasting profile or set of roasting profiles.

Referring to FIG. 1, the sensors 40 can include humidity (designated H) and oxygen (designated $O_2$) sensors. The controller 42 can use information from these sensors to track progress of the roasting steps 60-64 (of FIG. 3). As a unique example, the controller 42 can infer information about the roast process by analyzing the humidity versus time of gas that is exiting the outlet 6 of the roasting chamber 4.

A milestone event during roasting steps 60-64 is a "first crack" of the beans. Once this begins, the remaining time and temperature of the roasting profile can be more accurately determined. The added time and temperature is dependent on the type of roast (e.g., light roast versus full French roast).

Figure 4:
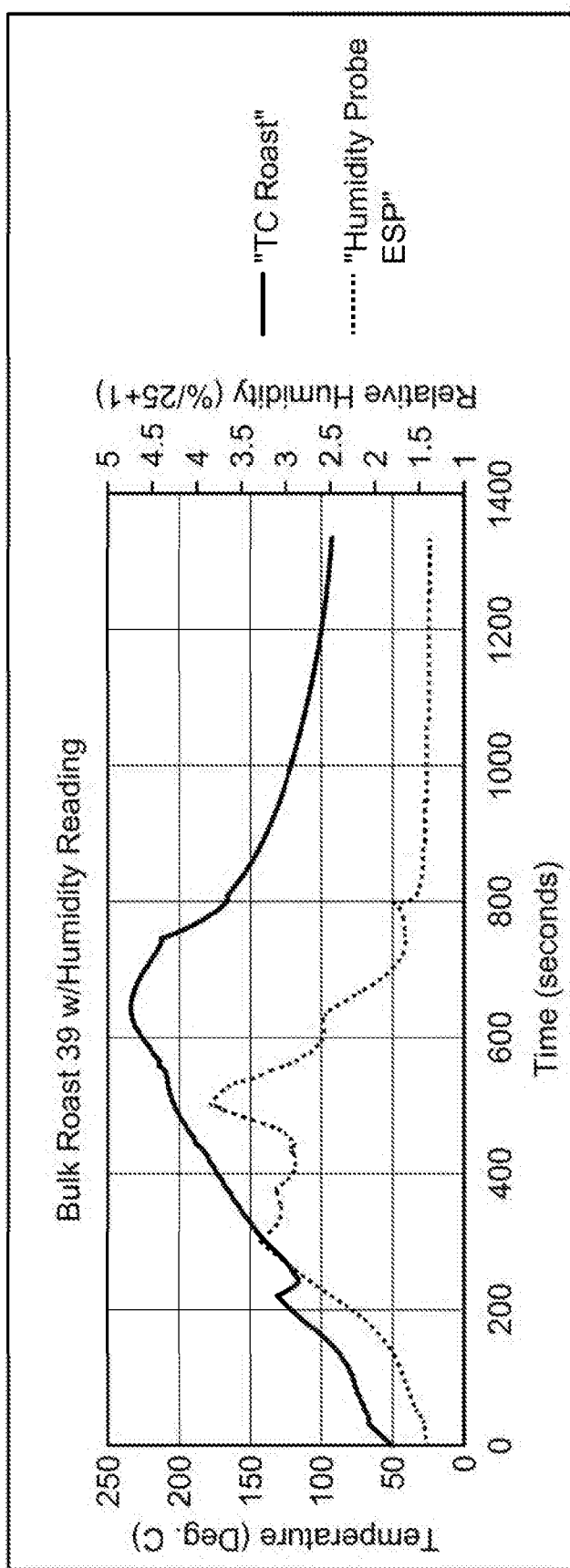
FIG. 4 is a graphical representation of an example of a roasting profile including graphs of temperature (solid) and humidity (dashed) versus time.

FIG. 4 is a graph of an example of temperature and humidity versus time. The dashed line represents the humidity versus time curve; the solid line represents the humidity temperature versus time curve. The values in this graph are generated using sensors 40 that are placed at or proximate to the outlet 6 of the roasting chamber 4. As shown, a relatively sharp peak in the graph of humidity versus time corresponds to the "first crack" milestone of the roasting development step 64. This peak in the humidity curve can be a factor in deciding subsequent steps in the roasting process.

Figure 5:
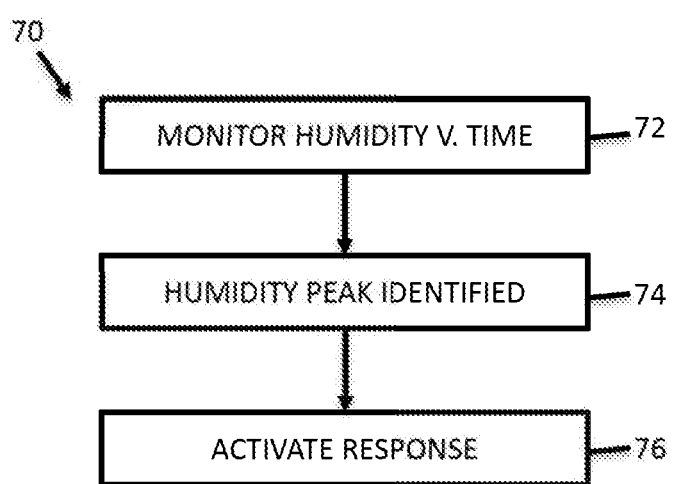
FIG. 5 is a flowchart representing a process that can take place during a roasting operation.

FIG. 5 is a flowchart depicting an example roasting process 70. Roasting process 70 can be similar to and/or preformed in conjunction with the roasting steps 60-64 except that it incorporates additional operations. According to step 72, the humidity is monitored by the H sensor 40 at the outlet 6 of roasting chamber 4. As part of step 72, the controller 42 analyzes the graph of humidity versus time (or an equivalent such as a look-up table stored in memory, an equation presenting the humidity-time curve) to identify rapid changes in a magnitude of the slope and a localized maximum.

According to step 74, a humidity peak is identified. This corresponds to the "first crack" of the beans. This identification of the humidity peak indicates a certain progress of the roasting process 70.

According to step 76, a response or action is activated in response to the identification of the first crack milestone. This can take any number of forms.

In one implementation the roast development duration is automatically adjusted based upon the milestone identification and a desired roast type. In this implementation parameters such as the heater power, airflow, and/or bypass percentages can also be adjusted.

In another implementation an alert can be automatically sent to a person who is responsible for the roasting operation. For example, this can be a message wirelessly sent to a mobile device that is utilized by the person. The message can provide an option for the person to adjust the roast profile based upon the timing of the milestone.

Figure 6:
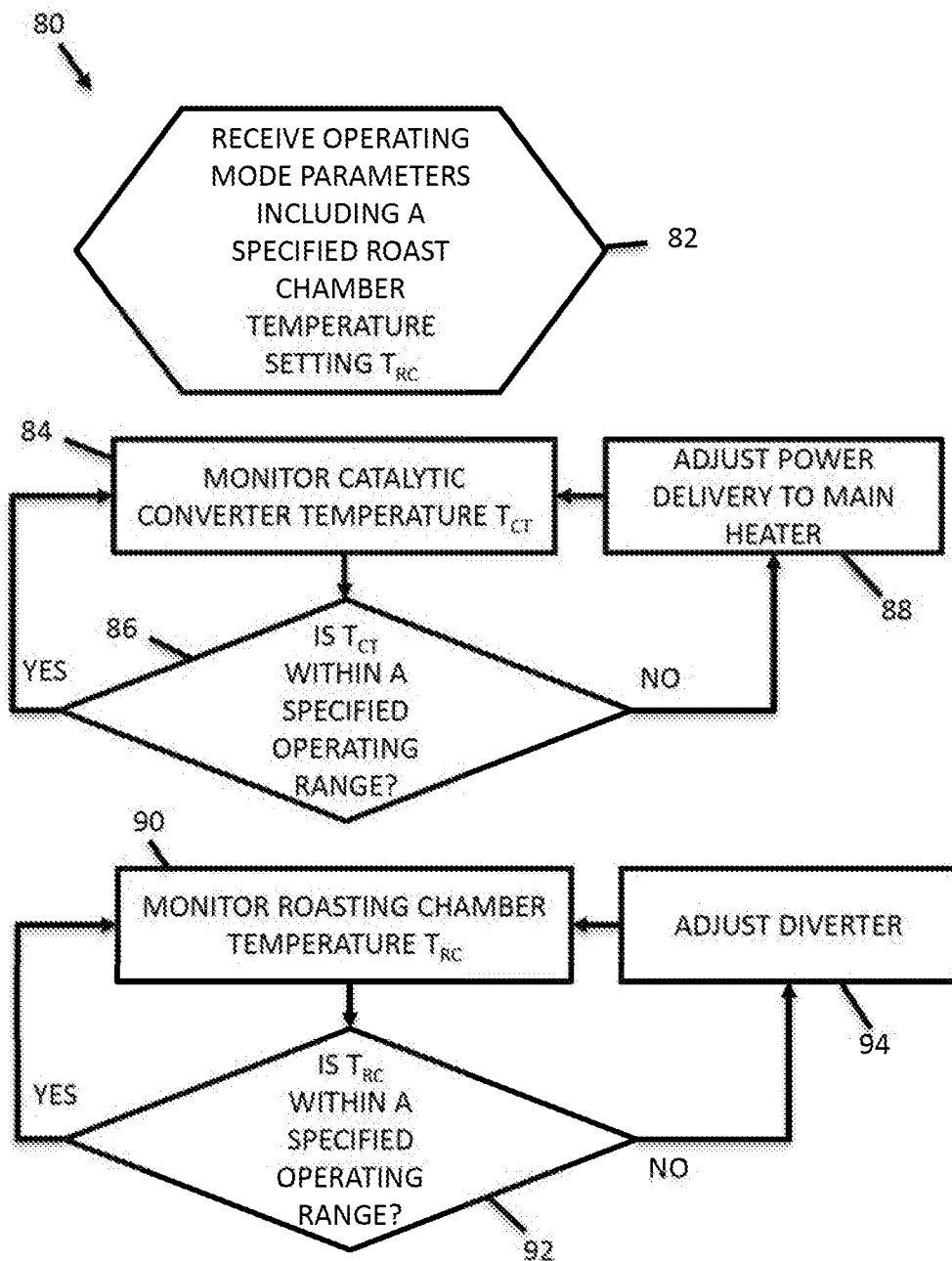
FIG. 6 is a flowchart depicting an example method by which a controller modulates temperatures for catalytic converter and roasting chamber for a given operating mode, according to an embodiment.

FIG. 6 is a flowchart depicting an example method 80 by which the controller 42 modulates temperatures for the catalytic converter 30 and the roasting chamber 4 for a given operating mode. As discussed above, the catalytic converter 30 temperature $T_{CT}$ can be maintained at an optimum temperature for catalysis that tends not to change as a function of an operating mode of the roasting system 2. On the other hand, the roast chamber 4 temperature $T_{RC}$ is a function of the operating mode.

According to step 82 the method 80 begins with a receipt of operating parameters for an operating mode including a specified roast chamber setting $T_{RC}$. The method 80 then includes two independent temperature control loops that can be executed concurrently. An example catalytic converter 30 temperature $T_{CT}$ control loop is depicted by steps 84 to 88. An example roasting chamber 4 temperature control loop is depicted by steps 90 to 94.

According to step 84 a temperature $T_{CT}$ of the catalytic converter 30 is monitored. As part of step 84, the controller 42 receives temperature $T_{CT}$ data for the catalytic converter 30 from a temperature sensor 40 that is within or proximate to or receiving air exiting from the catalytic converter 30.

According to step 86 a determination is made as to whether the temperature $T_{CT}$ of the catalytic converter 30 is within a specified range. This specified temperature range is within an overall temperature range of for example 500 to 1000 degrees Fahrenheit. In one implementation the specified temperature range is narrower and centered around a temperature of about for example 800 degrees Fahrenheit. If the temperature $T_{CT}$ of the catalytic converter 30 deviates from the specified range, then the method 80 proceeds to step 88. According to step 88 a power delivered to the main heater 28 is adjusted to counteract the temperature deviation determined in step 86. As part of step 88 the controller 42 sends a control signal to adjust a power input to the heater 28. Then steps 84 and 86 are repeated. When according to step 86 the temperature $T_{CT}$ of the catalytic converter 30 is within the specified range, the loop proceeds to step 84 to continue monitoring the temperature $T_{CT}$ of the catalytic converter 30.

According to step 90 a temperature $T_{RC}$ of the roasting chamber 4 is monitored. As part of step 90, the controller 42 receives temperature $T_{RC}$ data for the roasting chamber 4 from a temperature sensor 40 that is either within or proximate to or receiving air exiting from roasting chamber 4.

According to step 92 a determination is made as to whether the temperature $T_{RC}$ of the roasting chamber 4 is within a specified range. This specified range is based upon the specified roast chamber temperature setting $T_{RC}$ for the current operating mode from step 82. If the temperature $T_{RC}$ of the roasting chamber 4 deviates from the specified range, then the method 80 proceeds to step 94.

According to step 94, the variable diverter 22 is adjusted to counteract the deviation. As part of step 94 the controller 42 sends a control signal to the variable diverter 22. In response to the control signal, the variable diverter 22 increases or decreases the bypass percentage. For example, if the temperature is too high then the bypass percentage will be increased. Then steps 90 and 92 are repeated. When according to step 92 the temperature $T_{RC}$ of the roasting chamber 4 is within the specified range, the loop proceeds to step 90 to continue monitoring the temperature $T_{RC}$ of the roasting chamber 4.

The two temperature control loops for the catalytic converter 30 and the roasting chamber 4 continue independently of each other from the perspective of a control system operation. However, they do have an indirect dependency. When the heater 28 is adjusted according to step 88 this will impact the temperature $T_{RC}$ of the roasting chamber 4. Then the control loop for the roasting chamber 4 will most likely need to respond.

Figure 7:
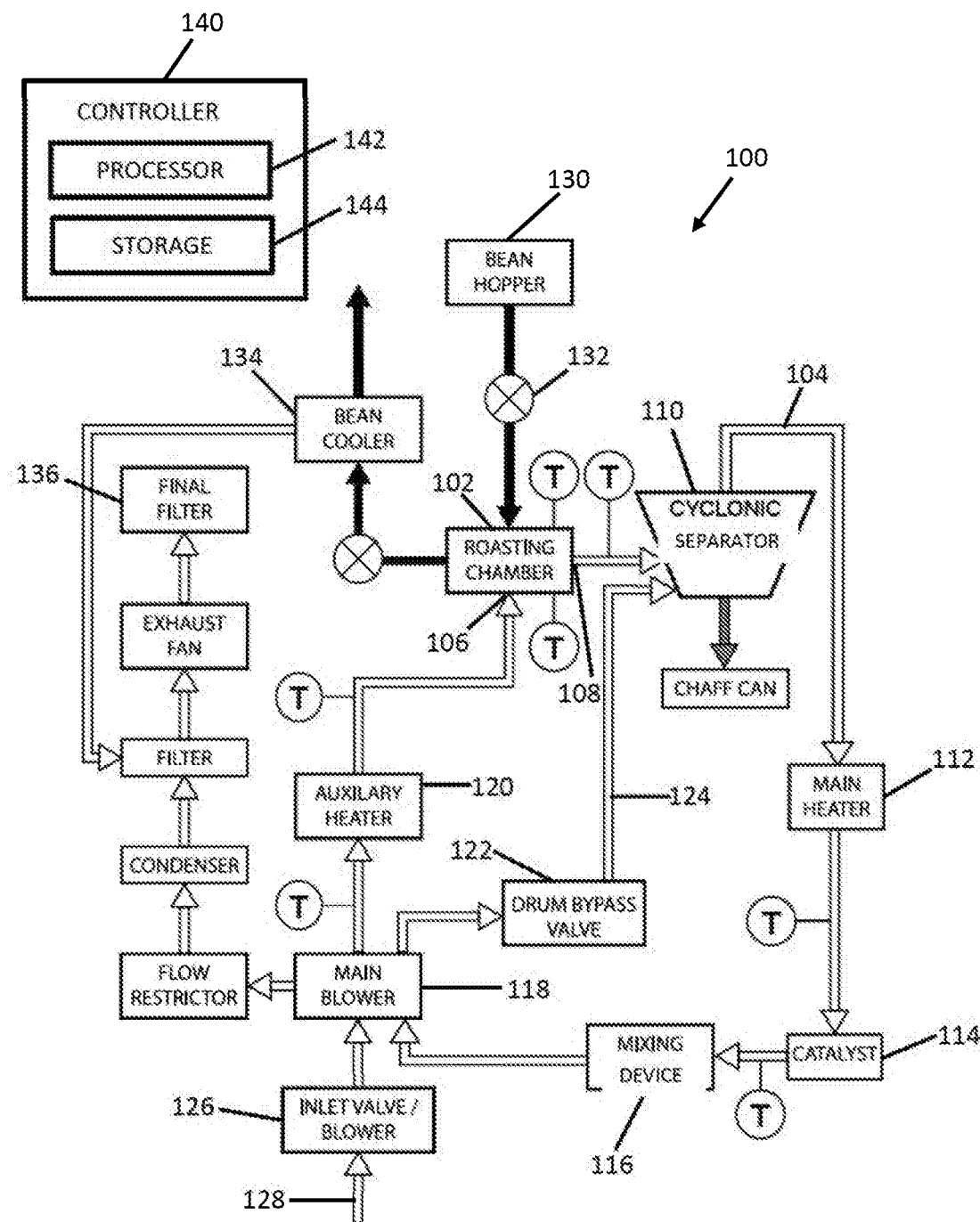
FIG. 7 is a block diagram schematic of a second embodiment of a roasting system.

FIG. 7 is a schematic block diagram of a second embodiment of a roasting system 100. Roasting system 100 is similar to roasting system 2 except that certain components have been added or reconfigured to add additional flexibility in defining operating modes. Thus, the previously-described operating modes can all be defined and effected using system 100.

System 100 includes a roasting chamber 102 that is fluidically coupled to a recirculating gas flow path 104. The roasting chamber 102 has a gas inlet 106 and a gas outlet 108. Recirculating gas passes out of the gas outlet 108, through the recirculating gas flow path 104, and to the gas inlet 106.

A plurality of components 110-120 at least partially define the recirculating gas flow path 104 including a cyclonic separator 110, a main heater 112, a catalytic converter 114, a mixing device or chamber 116, a main blower 118, and an auxiliary heater 120. In the illustrated embodiment, gas flows out of the gas outlet 108, through the cyclonic separator 110, through the main heater 112, through the catalytic converter 114, through the mixing device 116, through the main blower 118, through the auxiliary heater 120, and back to the gas inlet 106.

The plurality of components 110-120 are coupled to the recirculating gas flow path 104. Being coupled to the gas flow path 104 means that the gas flow path 104 individually and sequentially passes through the components 110-120. FIG. 7 depicts a particular sequence, but other sequences are possible and may provide the same function. Compared to the system 2 of FIG. 1, the system 100 of FIG. 7 provides an added ability to define operating modes.

A drum bypass valve 122 defines a bypass recirculating gas flow path 124 that bypasses the roasting chamber 102. The bypass valve 122 diverts a percentage of the gas flow received from the main blower 118 (e.g., from zero to up to 90 percent). In the illustrated embodiment, the bypass valve 122 directly couples the main blower 118 to the cyclonic separator 110.

An inlet valve and blower unit 126 couples an ambient inlet port 128 to the main blower 118. This allows outside ambient air to enter system 100 to replace air that exits system 100.

A bean hopper 130 is coupled to the roasting chamber 102 by valve 132 for initially dispensing beans into the roasting chamber 102. After a roasting process takes place, the beans can be transferred to a cooling chamber 134. During a cooling process, air from the cooling chamber 134 can be routed through various components including a final filter 136 before being ejected into an outside atmosphere. The exit of air from the final filter 136 is offset by the air received by the inlet valve and blower unit 126.

A controller 140 is controllably coupled to components of the system 100 including any or all of roasting chamber 102, cyclonic separator 110, main heater 112, catalytic converter 114, main blower 118, auxiliary heater 120, drum by pass valve 122, inlet valve and blower unit 126, bean hopper 130, valve 132, sensors T and/or other components. The controller 140 includes a processor 142 coupled to an information storage unit 144. The information storage unit 144 includes a non-transient or non-volatile storage device storing software instructions. When executed by the processor 142, the software instructions operate components of system 100 during a bean roasting process. The operation includes operation of a plurality of the components of system 100 to effect different operating modes. The different operating modes can be at least partly defined by a temperature of the roasting chamber 102 and/or the catalytic converter 114.

Figure 8:
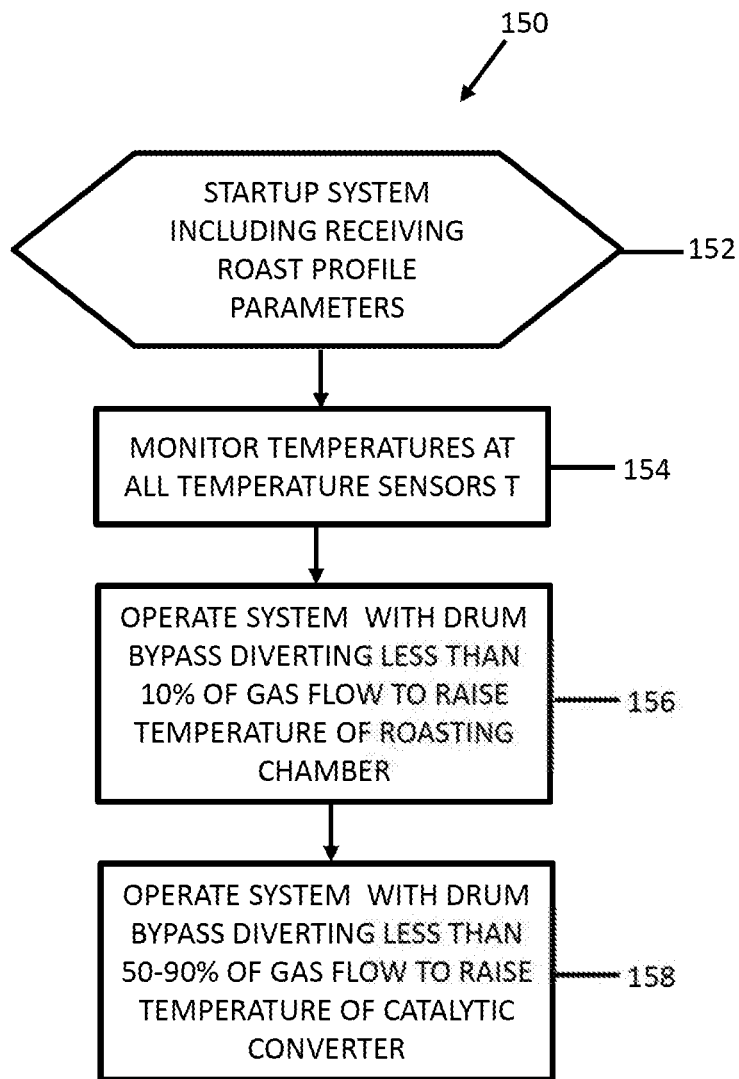
FIG. 8 is a flowchart of an embodiment of an embodiment of a method for starting up the system of FIG. 7.

FIG. 8 is a flowchart of an embodiment of a method 150 for starting up system 100. According to 152, system 100 has components that are cooler than is desirable during operation. Controller 140 receives operating parameters such as a bean development roasting temperature. According to 154, controller 140 monitors signals from temperature sensors (T). "Step 154" actually occurs continuously during further steps and operations.

According to 156, the roasting chamber 102 is raised to a specified operating temperature. During 156, the drum bypass valve 122 is either closed or diverts less than 10 percent of a flow of gas from the main blower 118. The main heater 112 and auxiliary heater 120 can operate at near full power levels to maximize the temperature rate increase of roasting chamber 102.

According to 158, the roasting chamber 102 is at or near the specified operating temperature. During 158, the drum bypass valve 122 is opened to divert 50 to 90 percent of the gas flow from main blower 118 directly to the cyclonic separator 110. Then, the main heater 112 can be used to further raise a temperature of the catalytic converter 114 (which had been partially raised during 156) until it reaches a desired operation temperature. During 158, the auxiliary heater 120 is primarily used to maintain the roasting chamber 102 at the desired operating temperature.

Earlier-discussed methods such as method 50 of FIG. 3 can apply to system 100. Compared to system 2, system 100 has more degrees of freedom and to provide various temperature-related operating modes. Thus, with system 100, all operating modes previously discussed are enabled.

The specific embodiments and applications thereof described above are for illustrative purposes only and do not preclude modifications and variations encompassed by the scope of the following claims.

What is claimed:

1. A bean roasting system, comprising:
   a roasting chamber coupled to a recirculating gas flow path that couples an outlet of the roasting chamber to an inlet of the roasting chamber, the recirculating gas flow path is coupled to and passes through a plurality of components between the inlet and the outlet, the plurality of components including:
   a cyclonic separator;
   a main heater;
   a catalytic converter; and
   a drum bypass valve that directly couples the catalytic converter to the cyclonic separator to bypass the roasting chamber; and
   a controller configured to activate a plurality of different predetermined operating modes for the bean roasting system by controlling at least the main heater and the drum bypass valve, the controller configured to increase a temperature of the catalytic converter relative to the roasting chamber by operating the drum bypass valve to divert an increased percentage of gas flowing directly from the catalytic converter to the cyclonic separator.

2. The system of claim 1, wherein the main heater is coupled between the cyclonic separator and the catalytic converter.

3. The system of claim 1, further comprising an auxiliary heater coupled between the catalytic converter and the roasting chamber, the controller further configured to control the auxiliary heater to provide the plurality of different operating modes.

4. The system of claim 1, wherein the plurality of components includes a main blower that is coupled between the catalytic converter and the roasting chamber, the controller is further configured to control the main blower to provide the plurality of different operating modes.

5. The system of claim 1, further comprising an inlet valve and blower unit coupled between an ambient air inlet port and the roasting chamber.

6. The system of claim 1, wherein one operating mode from the plurality of the operating modes is a startup operating mode in which, during operation of the bean roasting system, the drum bypass valve diverts less than 10 percent of the gas flow so that remaining airflow from the main heater passes through the roasting chamber to quickly bring the roasting chamber to an operating temperature.

7. The system of claim 1, wherein, during one operating mode from the plurality of the operating modes and during operation of the bean roasting system, beans are present in the roasting chamber and the drum bypass valve diverts at least 50 percent of the gas flow from the catalytic converter.

8. A bean roasting system, comprising:
a roasting chamber having a gas inlet and a gas outlet fluidically coupled to the gas inlet by a recirculating gas flow path;
a plurality of components at least partially defining the recirculating gas flow path,
during operation of the bean roasting system, gas flow between the gas inlet and the gas outlet passes through the plurality of components that include:
a cyclonic separator;
one or more heaters;
a catalytic converter; and
a main blower;
a drum bypass valve that couples the main blower to the cyclonic separator to bypass the roasting chamber; and
a controller configured to at least control a state of the one or more heaters and the drum bypass valve to provide independent closed loop temperature control of both the catalytic converter and the roasting chamber.

9. The system of claim 8, wherein the one or more heaters includes a main heater coupled between the cyclonic separator and the catalytic converter.

10. The system of claim 8, wherein the one or more heaters includes an auxiliary heater coupled between the main blower and the roasting chamber.

11. The system of claim 8, wherein the main blower is coupled between the catalytic converter and the roasting chamber, the controller is further configured to control the main blower to provide the plurality of different operating modes.

12. The system of claim 8, further comprising an inlet valve and blower unit coupled between an ambient air inlet port and the roasting chamber.

13. A bean roasting system, comprising:
a roasting chamber having a gas inlet and a gas outlet fluidically coupled to the gas inlet by a recirculating gas flow path;
a plurality of components at least partially defining the recirculating gas flow path,
during operation of the bean roasting system, gas flow between the gas inlet and the gas outlet passes through the plurality of components that include:
a cyclonic separator;
a main heater;
a catalytic converter;
a main blower; and
an auxiliary heater;
a drum bypass valve that couples the main blower to the cyclonic separator to bypass the roasting chamber; and
a controller configured to at least control a state of the main heater, the main blower, the auxiliary heater, and the bypass valve to effect a plurality of operating modes, the operating modes are individually defined at least by a temperature of the roasting chamber.

14. The system of claim 13, wherein the plurality of operating modes are at least further defined by a temperature of the catalytic converter.

15. The system of claim 13, wherein, along the recirculating gas flow path and during operation of the bean roasting system, gas flows from the gas outlet, through the cyclonic separator, through the main heater, through the catalytic converter, and back to the gas inlet.

16. The system of claim 15, wherein, along the recirculating gas flow path and during operation of the bean roasting system, the gas flows from catalytic converter, to the main blower, and to the gas inlet.

17. The system of claim 16, wherein, along the recirculating gas flow path and during operation of the bean roasting system, the gas flows from the main blower, through the auxiliary heater, and to the gas inlet.

18. The system of claim 17, further comprising an inlet valve and blower unit coupled between an ambient air inlet port and the recirculating gas flow path.

19. The system of claim 18, wherein the controller is further configured to control the inlet valve and blower unit to effect the plurality of operating modes.

* * * * *